Dec. 11, 1934.  E. A. FINGLER  1,983,973
CIRCUIT CLOSER
Filed Oct. 3, 1931   2 Sheets-Sheet 1
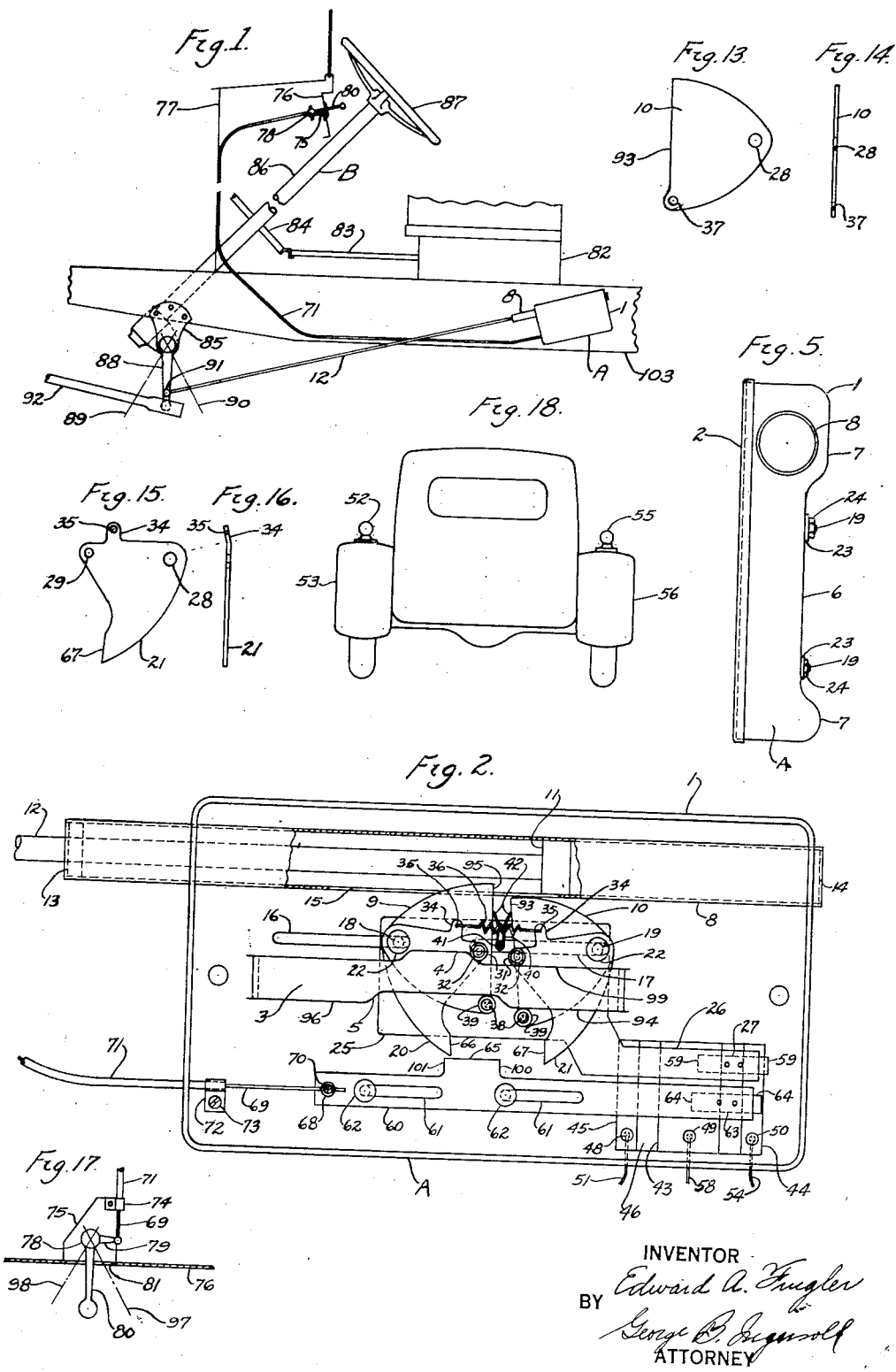

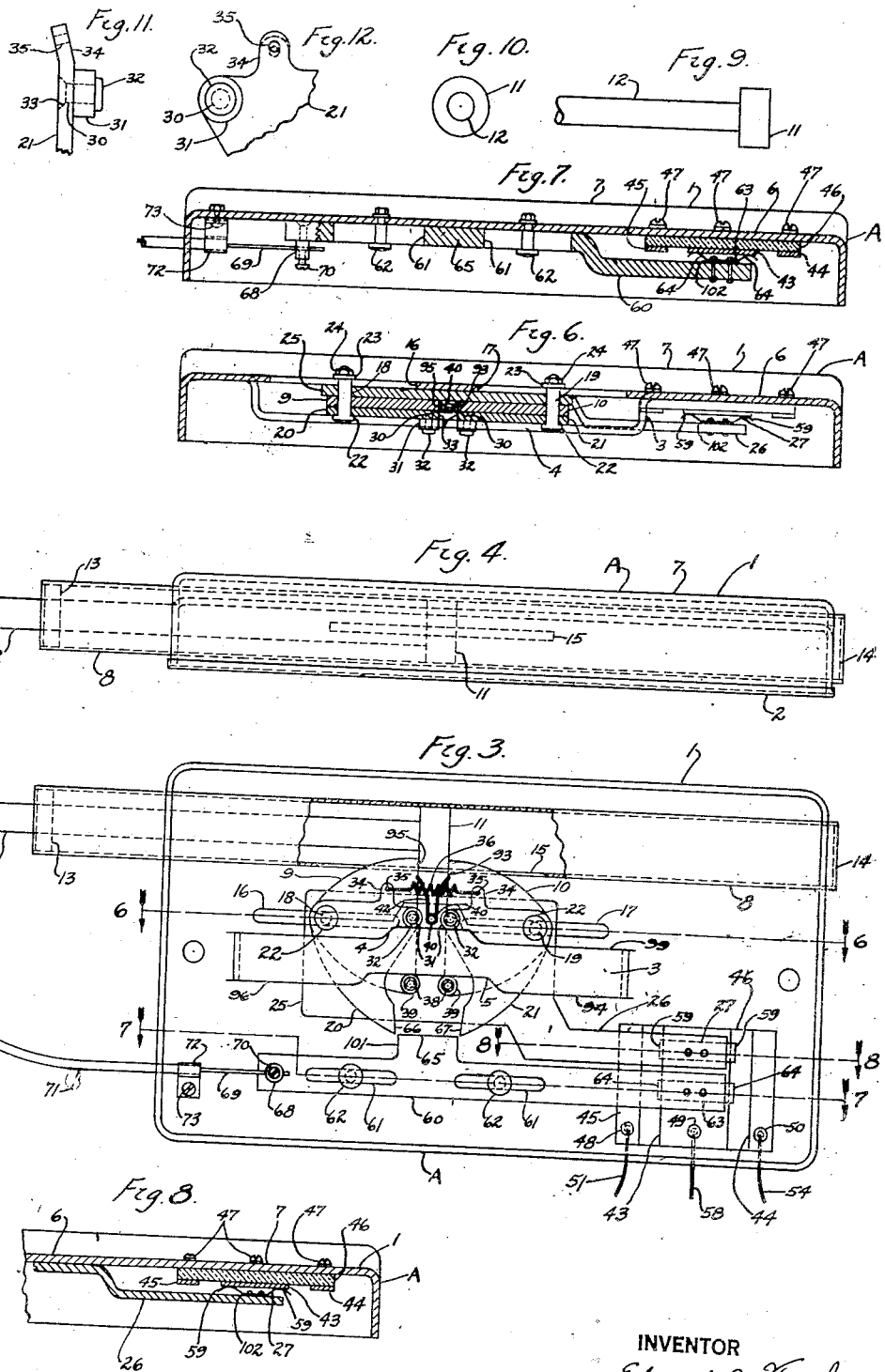

Patented Dec. 11, 1934

1,983,973

UNITED STATES PATENT OFFICE 1,983,973

CIRCUIT CLOSER

Edward A. Fingler, Detroit, Mich.

Application October 3, 1931, Serial No. 566,685

15 Claims. (Cl. 200—59)

My invention relates to improvements in circuit closers used in conjunction with warning signals or similar mechanisms; and the objects of my improvements are, first, to provide a circuit closer that can be operated by a moving portion of a vehicle or similar unit on which it is mounted; second, to provide a circuit closer that is adapted either for automatic operation, as by being operatively engaged by a movable portion of a vehicle, or for manual operation in conjunction with the automatic operation; third, to provide a circuit closing mechanism adapted for manual operation and in which the circuit closing mechanism is always restored to a neutral position; fourth, to provide a circuit closing mechanism adapted for a length of movement greater than the length of movement necessary to operate the circuit closing mechanism thereof; and fifth, to provide a circuit closing mechanism adapted to be intermittently operated by manual or automatically operated means.

I attain these objects by the mechanism illustrated in the accompanying drawings, in which—

Figure 1 is a partial side elevation of the signal mechanism installed on an automotive vehicle; Fig. 2, a side elevation of the switch mechanism in one of its circuit closing positions, said switch mechanism being disclosed without its cover; Fig. 3, a side elevation of the switch mechanism in its neutral position, said switch mechanism being disclosed without its cover; Fig. 4, a plan view of the switch mechanism; Fig. 5, an end elevation of the switch mechanism; Fig. 6, a horizontal section of the switch mechanism taken on the line 6—6, Fig. 3; Fig. 7, a horizontal section taken on the line 7—7, Fig. 3; Fig. 8, a partial horizontal section taken on the line 8—8, Fig. 3; Fig. 9, a partial side elevation of the piston member; Fig. 10, an end elevation of the piston member; Fig. 11, a partial end elevation of one of the dog members for engaging the piston, together with its roller member; Fig. 12, a partial side elevation of one of the dog members for engaging the piston, together with its roller member; Fig. 13, a side elevation of one of the dog members for engaging the piston; Fig. 14, an end elevation of one of the dog members; Fig. 15, a side elevation of one of the dog members for engaging the manually controlled slidable member of the switch mechanism; Fig. 16, an end elevation of one of the dog members for engaging the manually controlled slidable member of the switch mechanism; Fig. 17, a plan view of the manual control dash mechanism; and Fig. 18, a rear end elevation of an automotive vehicle with signal light members mounted thereon.

Similar numerals refer to similar parts throughout the several views.

The switch unit A comprising the circuit closing and operating mechanism, is mounted in the housing 1 provided with the cover 2 suitably mounted thereon. The housing 1 is preferably made of sheet material having a portion of its wall displaced to form the bridge or track portion 3 which is provided with upper and lower cam surfaces 4 and 5. However the housing 1, if desired, may be made of cast material having a closed rear wall portion 6 with the bridge portion 3 extending therefrom. The rear wall portion 6 is offset from the plane of the wall portions 7 of the housing 1 to permit the cylinder member 8 to be located with its longitudinal center on the vertical center of the plane in which the front and rear dog members 9 and 10 move as hereinafter disclosed.

The piston 11 is slidably mounted in the cylinder member 8, the piston 11 being attached to the rod 12 which is slidably mounted in the collar 13 which, in turn, is suitably mounted at the front end of the cylinder member 8. The rear end of the cylinder member 8 is closed by the portion 14. The cylinder member 8 is provided with the slot 15 through which extend the dog members 9 and 10.

The cylinder member 8, if desired may be constructed of a tubular member suitably mounted in the housing 1 or it may be integrally constructed therewith.

The wall portion 6 of the housing 1 is provided with the slots 16 and 17 in which slidably operate the pins 18 and 19 which form respectively a pivotal support for the dog members 9 and 10 and also the dog members 20 and 21. The pins 18 and 19 are each provided with the head portions 22 and the washers 23 and nuts 24 by means of which the dog members 9, 10, 20, and 21 together with the upper slidable member 25 are maintained in their adjacent positions with proper clearances therebetween to provide for the relative movement of said members 9, 10, 20, 21, and 25 which comprise sliding assembly having the outside surfaces of the dog members 20 and 21 and the slidable member 25 respectively engaging the inside surfaces of the wall portion 6 and the bridge portion 3. The slidable member 25 is supported on both of the pins 18 and 19 and is further provided with the arm 26 to which the contact member 27 is suitably connected.

The dog members 9, 10, 20, and 21 are provided with holes 28, through which respectively extend the pins 18 and 19. The dog members 20 and 21 are also each provided with holes 29 through which extend the pins 30 which support the rollers 31 which in turn rollably contact with the upper cam surface 4 of the bridge portion 3 of the housing 1, the pins 30 having a head portion 32 for retaining the rollers 31, the pins 30 being riveted at 33 to the dog members 20 and 21. The dog members 20 and 21 are each further provided with extension portions 34 offset from the longitudinal plane of said dog members 20 and 21, the extension portions 34 being provided with the holes 35 through which is attached the spring 36 which tends to always maintain the rollers 31 in engagement with the upper cam surface of the bridge portion 3.

The dog members 9 and 10 are each provided with holes 37 in which are pins 38, mounted similarly to the pins 30 which are riveted to the dog members 20 and 21, the pins 38 being of sufficient length to enable the rollers 39, which are rollably supported on the pins 38, to engage the lower cam surfaces 5 on the bridge portion 3.

The spring 40 is suitably mounted on the stud 41 which is suitably mounted on the upper slidable member 25, the spring 40 being provided with resilient portions 42 for engaging the end surfaces of the dog members 9 and 10, the resilient portions 42 always tending to force the dog members 9 and 10 apart, thus tending to always pivotally move the dog members 9 and 10 respectively around the pins 18 and 19 and thus further causing the rollers 39 to always engage the cam surface 5 of the bridge portion 3.

The switch unit A is further provided with the electrical contact blocks 43, 44, and 45 which are suitably mounted on the insulator block 46 which may be suitably attached to the rear wall portion 6 of the housing 1 by the screws 47. The electrical contact blocks 43, 44, and 45 are respectively provided with the electrical terminal screws 48, 49, and 50 which are suitably mounted respectively therein.

The electrical terminal screw 48 is electrically connected, by the cable 51, with the signal light 52 which may be suitably mounted on the rear fender 53 of an automotive vehicle as disclosed in Fig. 18. In a similar way, the electrical terminal screw 50 is electrically connected, by the cable 54, with the signal light 55 which may be suitably mounted on the rear fender 56 of an automotive vehicle as disclosing in Fig. 18. It is to be understood that the signal lights 52 and 55 will be suitably further connected electrically with the storage battery (not shown) of the automotive vehicle in such manner as to allow electrical circuit of the signal lights 52 and 55 and the electrical terminal screws 48 and 50 to be respectively closed and completed through the terminal screw 49 and the cable 58 connected therewith, the contact member 27 closing the electrical circuit to the signal light 55 when the slidable member 25 together with its extension portion 26 has been operatively moved to the position as disclosed in Fig. 2, in which the resilient arms 59 of the member 27 contact with both the contact member 43 and the contact member 44. In a similar way the contact member 27 will close the electrical circuit to the signal light 52 when the slidable member 25 together with its extension portion 26 has been operatively moved to the position in which the resilient arms 59 of the contact member 27 will contact with both of the contact members 43 and 45. It is to be noted that the resilient arms 59 of the contact member 27 will both engage with the contact member 43 when the slidable member 25 and its extension portion 26 is in the neutral position, as disclosed in Fig. 3, the contact member 43 being of greater width than the contact members 44 and 45.

The lower slidable member 60 is provided with slots 61 which engage the stud members 62 which are suitably mounted in the rear wall portion 6 of the housing 1, the stud members 62 being each provided with portions for retaining and supporting the lower slidable member 60 in its slidable movement. The lower slidable member 60 is of sufficient length to extend to a position adjacent the contact members 43, 44, and 45 and it is provided with a contact member 63 having resilient arms 64 for engaging said contact members 43, 44, and 45 in a manner similar to that of the contact member 27 on the extension portion 26 of the upper slidable member 25, the contact member 63 functioning similarly to the contact member 27.

The lower slidable contact member 60 is provided with the extension portion 65 for engaging the surfaces 66 and 67 respectively of the dog members 20 and 21 as hereinafter disclosed.

The stud 68 is suitably mounted on the lower slidable member 60 and is attached to the cable 69 by means of the screw 70 being threadably mounted in the stud 68 in such manner as to clamp the end of the cable 69 in the stud 68. The cable 69 is slidably mounted in the flexible tubing 71 which is clamped in the bracket 72 which in turn is attached to the housing 1 by the screw 73. The flexible tubing 71 is also supported and clamped in the bracket 74 which is supported on the bracket 75 which, in turn, is supported on the dash panel 76 of the automotive vehicle, the dash panel 76 being part of the cowl assembly 77, as disclosed in Figs. 1 and 17. The bell crank 78 is suitably mounted on the bracket 75 and is provided with the arm 79, which is suitably attached to the cable 69, together with the handle portion 80 which extends through an opening 81 in the dash panel 76 to a convenient position in which said handle portion 80 is operable by the driver of the automotive vehicle.

The switch unit A is suitably mounted on the frame 103 of the automotive vehicle, the frame 103 supporting the seat 82, the floor board 83, the toe board 84, and the cowl assembly 77.

The steering gear assembly B is supported in the bracket 85, which is suitably mounted on the frame 103, the column 86 of the steering gear assembly B extending through the toe board 84 at a suitable angle to position the steering wheel 87 adjacent the operator of the automotive vehicle. The steering gear assembly B is provided with the steering arm 88, which swings through an approximate angle as indicated by the lines 89 and 90, and is suitably connected at 91 to the rod 12 which operates the piston 11 of the switch unit A. The steering arm 88 is suitably connected with the steering rod 92 which is operatively connected, in the usual manner, with the steering mechanism of the front axle assembly (not shown) of an automotive vehicle.

The location of the connection point 91 on the steering arm 88 will regulate and determine the distance travelled by the piston 11 in the cylinder member 8 of the switch unit A. A desirable location of the connection point 91 would be such as to result in the engagement of the contact member 27 respectively with the contact blocks 43 and 45 and with the contact blocks 43 and 44 during the movement of the steering arm 88 through an angle of five degrees respectively each side of the vertical or neutral center of the steering arm 88, this movement corresponding to a slight right or left turn of the front wheels (not shown) of the automotive vehicle from its straight ahead position.

If the steering arm 88 continues to be moved beyond the travel necessary to close the electrical circuit through the contact blocks 43 and 46, the continuous movement of the steering arm 88 beyond such necessary contact closing position corresponding to a situation where the steering gear assembly B is operated to cramp the front wheels (not shown) of the vehicle sufficiently to make an extreme right turn of the vehicle, the piston 11 will become disengaged from the dog member 10, thus allowing the piston 11 to continue its travel in the cylinder member 8 without imposing further stresses in or further operating the circuit closing mechanism.

As the operator turns the steering wheel 87 to cause the steering arm 88 to actuate the steering rod 92 rearwardly to cause the wheels (not shown) to turn to the left, the rod 12 will move the piston 11 rearwardly in the cylinder member 8, the piston 11 engaging the surface 93 of the dog member 10, thus moving the dog member 10 rearwardly, the pin 19 sliding along the slot 17. As the dog member 10 is moved rearwardly away from its neutral position, as disclosed in Fig. 3, the roller 39, mounted on the pin 38, will follow down the cam surface 5 of the bridge 3 until it rides on the rearward portion 94, thus allowing the dog member 10 to pivot on the pin 19 and allow its face 93 to move to a sufficiently lower position where it will not be engaged and moved by the piston 11, thus allowing the piston 11 to continue to move, in accordance with the further rearward movement of the steering arm 88, to a position beyond the necessary movement for causing the contact member 27 to engage the contact blocks 43 and 44 and to close the electrical circuit through the cables 54 and 58 for causing the signal light 52 to become illuminated for indicating the left turn which the vehicle will be making.

In a similar manner when the steering arm 88 is caused to move forwardly the rod 12 will cause the piston 11 to engage the face 95 of the dog member 9 which will cause its roller 39 to follow the cam surface 5 forwardly and downwardly on to the surface 96 of the bridge 3, thus causing the face 95 to be moved downwardly out of engagement with the piston 11, at which time the contact member 27 will have moved forwardly so that it engages the contact blocks 43 and 45 which will close the electrical circuit through the cables 51 and 58 for causing the signal light 55 to become illuminated for indicating the right turn which the vehicle will be making, the piston 11 continuing to move forwardly in accordance with the necessary further movement of the steering arm 88.

When the front wheels of the vehicle are straightened up, after making the turns as above disclosed, the steering arm 88 will return to a neutral position, this in turning moving the rod 12 and the piston 11 to a neutral position, as disclosed in Fig. 3, the piston 11, on its return movement to its neutral position, again re-engaging respectively the faces 93 and 95 of the dog members 10 and 9, one of the dog members 9 and 10 always having its roller 39 in engagement with the lowermost or straight surfaces 94 or 96 of the cam 5, when the other of the dog members has its roller 39 engaging the central or straight portion of the cam surface 5 of the bridge 3 in the circuit closing positions.

It will thus be noted that the operation of my signal mechanism, as above disclosed will operate automatically to make and break the electrical circuits of the signal lights 52 and 55, when the steering gear assembly B is operated by the operator of the automotive vehicle.

When it is desired to operate the signal mechanism semi-automatically or manually, the handle portion 80, mounted on the dash panel 76, may be moved either to the right turn position, on the line 97, or to the left turn position, as on the line 98, as disclosed in Fig. 17, to operate the signal mechanism for either a right or left turn.

If the handle portion 80 is moved to the line 97, the signal mechanism will be set for a right turn, this immediately indicating a right turn by causing the signal light 55 to be illuminated. When the handle portion 80 is moved to the line 97, the arm 79 will slidably move the cable 69 in the flexible tubing 71, the cable 69 moving the slidable member 60 rearwardly until the contact member 63 engages both of the contact blocks 43 and 44, as disclosed in Fig. 2, thus closing the electrical circuit through the cables 58 and 54 and causing the signal light 55 to be illuminated to indicate the right turn the vehicle is or will be making, the slidable member 60 being supported by the slots 61 engaging the stud members 62.

After the slidable member 60 has been manually moved, as above disclosed, to indicate a proposed right turn, and the right turn is being made, the piston 11 will be moved rearwardly automatically, as above disclosed, until the dog member 10 has again been moved sufficiently to cause the contact member 27 to occupy a circuit closing position which of itself is incidental. However, whenever the dog member 10 has been moved rearwardly by the piston 11, the dog member 21 has also been moved rearwardly together with the dog member 10, the dog member 21 being also pivotally mounted on the pin 19, the roller 32 of the dog member 10 riding down the cam surface 4 to the straight portion 99 on the upper side of the bridge 3. Thus it will be noted that after the signal mechanism has been manually set to indicate that a right turn will be made and the right turn has been completed, the dog member 21 will always be automatically returned to its neutral position by the engagement of the piston 11 and the face 95 of the dog member 9, the dog member 21 will pivot on the pin 19 while the roller 32 will be resiliently held in engagement with the cam 4, thus causing the dog member 21 to be pivotally raised from its position, as disclosed in Fig. 2, to its neutral position as disclosed in Fig. 3, the extension portion 65, of the lower slidable member 60, being so located, relative to the dog member 21, so that the face 67 of the dog member 21 will engage the face 100 of the extension portion 65 sufficiently, before the dog member 21 arrives at its neutral position, so that the extension portion 65 will also be moved to its neutral position, as disclosed in Fig. 3, thus moving the contact member 63 back into engagement only with the contact block 43 and breaking the signal lighting circuit.

It is to be noted that the lowest point of the dog member 21 will be below the upper surface of the extension portion 65, as disclosed in Fig. 2, for a portion of its movement but that the lowest point of the dog member 21 will have been moved upwardly, by its cam controlled movement, sufficiently to have its lowest point slightly above the upper surface of the extension portion 65 when the dog member 21 and the extension portion 65 are in their neutral positions as disclosed in Fig. 3.

It is to be noted that the lower slidable member 60 may be manually moved forwardly to make the proper closing contacts to signal a left turn by moving the handle portion 80 to the line indicated at 98, the face 101 of the extension portion 65 being automatically engaged by the face 66 of the dog member 20 when the lower slidable member is being automatically returned to a neutral position, after having been manually moved forwardly to a position indicating a left turn of the automotive vehicle.

It is to be noted that if the operator manually indicates a right or left turn of the vehicle and then decides not to complete the indicated turn, the manual control mechanism may be reset to a neutral position as desired.

Also if a left turn is indicated manually and the operator finds it necessary to stop the vehicle in the center of an intersection, as is very often necessary, the signal light 52 will continue to be illuminated to indicate a left turn until the left turn is completed.

It is also to be noted that if the vehicle has been driven into a street intersection and stopped with its front wheels in a straight ahead position or in an angular position, the respective signal light will continue to be illuminated until the contemplated turn has been completed.

Also in making a right turn, the manual control mechanism having been used to indicate such a right turn, the setting of the manually controlled indicating mechanism will in no wise be disturbed by the vehicle making any slight turn to the left before again turning to the right as indicated, such a slight turn being sometimes necessary to avoid a curb while turning a corner of the street, the left turn signal light 52 being illuminated momentarily during such operation. The contact member 63 may be insulated from the lower slidable member 60 and the contact member 27 may be insulated from the arm 26 by the insulator blocks or members 102.

I claim:

1. In a signal mechanism for an automotive vehicle, the combination of a track provided with cam surfaces on its upper and lower sides, a pair of oppositely disposed dog members, each of said oppositely disposed dog members being pivotally mounted, each of said oppositely disposed dog members being provided with roller members engaging the cam surface on the lower side of said track, another pair of oppositely disposed dog members, each of said last mentioned dog members being pivotally mounted, each of said last mentioned oppositely disposed dog members being provided with roller members engaging the cam surfaces on the upper side of said track, resilient means for maintaining the rollers of said first mentioned oppositely disposed members in engagement with said track, resilient members for maintaining the rollers of said second mentioned oppositely disposed members in engagement with said track, a piston engaging said first mentioned oppositely disposed dog members, a steering gear, means connecting said steering gear and said piston, stationary switch contact members manually operated means engaging said last mentioned oppositely disposed dog members, said manually operated means being provided with movable switch contacts for engaging said stationary switch contact members, and means suitably mounted to move with said dog members, said last mentioned means being provided with switch contacts adapted to contact said stationary switch contact members.

2. In a circuit closer mechanism for a vehicle provided with a steering mechanism, the combination of a housing, a track suitably supported by said housing, said track being provided with oppositely disposed cam surfaces, a plurality of pairs of oppositely disposed dog members pivotally mounted, roller members suitably mounted on each of said dog members, said roller members engaging the cam surfaces of said track, resilient means maintaining said roller members in engagement with said track, stationary switch contact members, a slidably mounted member operatively connected with said dog members and provided with switch contacts for engaging said stationary switch contact members, a manually operable member suitably mounted and provided with switch contacts for engaging said stationary switch contact members, said manually operable member being adapted for engagement with one of the pairs of said dog members, and a piston member suitably mounted and operatively connected with the steering mechanism of the vehicle, said piston member being adapted to engage one of the pairs of said dog members.

3. In a circuit closer mechanism for a vehicle provided with steering mechanism, the combination of a track member suitably mounted and provided with cam surfaces, dog members rollably engaging the cam surfaces of said track, a slide member suitably mounted and adapted to move with said dog members, said slide member being provided with switch contact members, means operatively connecting said dog members with the steering mechanism of the vehicle, manually operable means provided with switch contact members and adapted to be operated by said dog members, and stationary switch contact members adapted to be engaged by the switch contact members of said slide member and said manually operable means.

4. In a circuit closer mechanism for a vehicle provided with control means, the combination of a track member suitably mounted and provided with oppositely disposed cam surfaces, a pair of oppositely disposed dog members operatively engaging the cam surfaces on one side of said track member, a pair of oppositely disposed dog members operatively engaging the cam surfaces on the opposite side of said track member, a slide member operatively connected with said dog members and provided with switch contact members, means operated by the control means of the vehicle and operatively engaging one of said pair of dog members, manually operated means adapted to operatively engage one of said pair of dog members and provided with switch contact members, and switch contact members suitably mounted and adapted for engagement with the switch contact members of said slide member and said manually operated means.

5. In a circuit closer mechanism for a vehicle provided with steering mechanism, the combination of suitably mounted switch contact members, a track member provided with cam portions, slidably mounted members, dog members suitably mounted to engage the cam portions of said track member and operatively connected with the steering mechanism of the vehicle, said dog members being pivotally mounted on said slidably mounted members, means operatively connected with said dog members and provided with switch contacts for engaging said first mentioned switch contact members, and manually operable means adapted to engage and move said dog members, said manually operable means being provided with switch contact members for engaging said first mentioned switch contact members.

6. In a circuit closer mechanism, the combination of a signal control mechanism comprising a pair of dog members pivotally mounted on opposite sides of and operatively engaging a track member provided with cam portions said dog members being further slidably mounted to have a predetermined length of movement in opposite directions, said dog members being further provided with means adapted to move therewith and having switch contact members, switch contact members suitably mounted and engaged by the switch contact members of said dog members, and means for operating each of said dog members in opposite directions with a length of movement greater than the length of movement necessary to move said switch contact members into engagement with said second mentioned switch contact members.

7. In a circuit closer mechanism for a vehicle, the combination of a track member provided with cam portions on its opposite sides, a pair of dog members pivotally mounted on one side and movably engaging the cam on the other side of said track member, said dog members being provided with means adapted to move therewith and having switch contact means, switch contact means suitably mounted and adapted for engagement with the switch contact means of said dog members, means operatively connecting said dog members with a movable portion of the vehicle, and manually operable means adapted to engage and move said dog members, said manually operable means being provided with switch contact means for engaging said second mentioned switch contact means.

8. In a circuit closer mechanism for a vehicle, the combination of a track member, pivotally mounted dog members engaging said track member and provided with switch contact means, switch contact means suitably mounted, means on one side of said track member for operatively connecting said pivotally mounted dog members with a movably portion of the vehicle, and manually operable means on the other side of said track members for operatively engaging and moving said pivotally mounted dog members, said manually operable means being provided with switch contact means for engaging said second mentioned switch contact means.

9. In a circuit closer mechanism for a vehicle provided with a steering arm, the combination of a track member suitably mounted and provided with oppositely disposed cam portions, circuit closing means having pivotally mounted portions rollably engaging the cam portions of said track member, switch contact means engaged by the circuit closing means, and means operatively connecting said circuit closing means with the steering arm of the vehicle, said last mentioned means being operatively connected with said circuit closing means.

10. In a circuit closer mechanism for an automotive vehicle provided with steering means, the combination of a cylinder member provided with a slot through its wall, a pair of pivotally mounted members extending through the slot in said cylinder member, said pivotally mounted members being further slidably mounted and provided with switch contact means, a track member provided with cams and engaging said pivotally mounted members, a piston movably mounted in said cylinder member, said piston being adapted to engage and move said pivotally mounted members, said piston being operatively connected with the steering mechanism of the vehicle, and switch contact members suitably mounted and adapted for engagement with the switch contact means of said pivotally mounted members.

11. In a circuit closer mechanism for a vehicle provided with a movably mounted arm for connecting with a steering drag link member, the combination of a movably mounted piston member operatively connected with said movably mounted arm of the vehicle, a track member suitably mounted and provided with cam portions, pivotally mounted members engaged and activated by said movably mounted piston member throughout a portion only of the movement of said movably mounted piston member, said pivotally mounted members engaging the cam portions of said track member, said pivotally mounted members being further provided with a switch contact member adapted for movement therewith, and switch contact members suitably mounted and adapted to be engaged by the switch contact members of said pivotally mounted members.

12. In a circuit closer mechanism, the combination of a cylinder member suitably mounted, a piston suitably mounted in said cylinder member and operatively connected with a movably mounted portion of the vehicle, a pair of pivotally mounted members adapted to be alternately engaged and operated by said piston and provided with switch contact means, cam means suitably mounted and adapted to move said pivotally mounted member into and out of engagement with said piston, and switch contact members suitably mounted and adapted to engage the switch contact members of said pivotally mounted members.

13. In a circuit closer mechanism for a vehicle, the combination of a track suitably mounted and provided with oppositely disposed cam portions, a pair of members pivotally mounted, a roller suitably mounted on each of said members and operatively engaging the cam portions of said track on its side opposite the pivotal points of said pair of members, a switch contact member operatively connected and movable with said pair of members, resilient means for maintaining said rollers in engagement with the cam portions of said track, switch contact members suitably mounted and engaged by the switch contact member operatively connected and movable with said pair of members, and means operatively connecting said pair of members with a movably mounted portion of the vehicle.

14. In a circuit closer mechanism for a vehicle, the combination of a housing having a wall provided with a slot therein, a track suitably supported from the wall of said housing and provided with cams, a pair of pivotally mounted members slidably supported in the slot of said housing, said pair of pivotally mounted members extending between the wall of said housing and said track, said pair of pivotally mounted members being provided with switch contact means, said pair of pivotally mounted members being operatively connected with a movably mounted portion of the vehicle, and switch contacts suitably mounted and adapted to be engaged by the switch contact means of said pair of pivotally mounted members.

15. In a circuit closer mechanism for a vehicle, the combination of a movably supported member provided with switch contact means, a manually operated member suitably mounted, flexible means operatively connecting said movably supported member and said manually operated member, pivotally mounted members, said pivotally mounted members being further slidably mounted, an actuating member engaging said pivotally mounted members, operatively connected with a movable portion of the vehicle, switch contact members connected with and adapted to be moved with said pivotally mounted members, track means provided with cams for guiding the movement of said pivotally mounted members, and switch contact means suitably mounted and adapted to be engaged by the switch contact means of said movably supported member and with said switch contact members connected with said pivotally mounted members.

EDWARD A. FINGLER.